US012738862B2

(12) United States Patent
Bradac

(10) Patent No.: US 12,738,862 B2
(45) Date of Patent: Sep. 15, 2026

(54) HIGH BANDWIDTH MODULATION

(71) Applicant: Rimac Technology LLC, Sveta Nedelja (HR)

(72) Inventor: Frantisek Bradac, Breclav (CZ)

(73) Assignee: RIMAC TECHNOLOGY LLC, Sveta Nedelja (HR)

( * ) Notice: Subject to any disclaimer, the term of this patent is extended or adjusted under 35 U.S.C. 154(b) by 142 days.

(21) Appl. No.: 18/916,219

(22) Filed: Oct. 15, 2024

(65) Prior Publication Data

US 2025/0192694 A1 Jun. 12, 2025

(30) Foreign Application Priority Data

Dec. 12, 2023 (EP) .................................... 23215794

(51) Int. Cl.
*H02M 7/483* (2007.01)
*H02M 7/5395* (2006.01)

(52) U.S. Cl.
CPC ......... *H02M 7/483* (2013.01); *H02M 7/5395* (2013.01)

(58) Field of Classification Search
CPC .......... H02M 3/07; H02M 3/073; H02M 7/10; H02M 7/103; H02M 7/106; H02M 1/088; H02M 2003/071; H02M 2003/072; H02M 2003/075; H02M 2003/076; H02M 2003/077; H02M 2003/078; H02M 2001/007; H02M 2001/0048; H02M 7/519; H02M 7/521; H02M 7/523; H02M 7/75; H02M 7/757; H02M 7/7575; H02M 7/66; H02M 7/68; H02M 7/72; H02M 7/483; H02M 2007/4835; H02M 7/487; H02M 1/08; H02M 1/084; H02M 1/0845; H02M 7/515; H02M 7/525; H02M 7/527; H02M 7/529; H02M 7/539; H02M 5/2573; H02M 1/081; H02M 5/293; H02M 7/12; H02M 3/10; H02M 3/125; H02M 3/13; H02M 3/135; H02M 3/145; H02M 3/15;

(Continued)

(56) References Cited

U.S. PATENT DOCUMENTS 5,883,797 A * 3/1999 Amaro .................... H02J 1/102 323/272
7,612,512 B2 * 11/2009 Loibl ........................ H02P 7/28 318/400.29
8,004,111 B2 * 8/2011 Potter ....................... G06F 1/26 307/18

OTHER PUBLICATIONS

EPO, Extended European Search Report for EP Application No. 23215794.1, Jun. 4, 2024.

(Continued)

*Primary Examiner* — Crystal L Hammond
*Assistant Examiner* — Nusrat Quddus
(74) *Attorney, Agent, or Firm* — Hodgson Russ LLP

(57) ABSTRACT

A control system for controlling a multilevel converter comprising a plurality of switching modules, each switching module connected to an energy source, the control system comprising: a central control unit; and one or more module control units, wherein the central control unit is configured to transmit a command for controlling the plurality of switching modules to the one or more module control units before a start of a pulse width modulation, PWM, period, wherein each of the one or more module control units is configured to receive the command from the central control unit before the start of the PWM period and apply the command to one or more switching modules of the plurality of switching modules within the PWM period.

15 Claims, 5 Drawing Sheets

(58) Field of Classification Search
CPC ...... H02M 3/155; H02M 3/156; H02M 3/158; H02M 3/1588; H02M 2003/1566; H02M 3/1582; H02M 2003/1557; H02M 3/22; H02M 1/36; H02M 3/24; H02M 3/325; H02M 3/335; H02M 3/28; H02M 3/33569; H02M 3/33507; H02M 2007/4815; H02M 2007/4818; H02M 1/083; H02M 3/33538; H02M 3/33546; H02M 3/33515; H02M 3/33576; H02M 3/33592; H02M 3/33553; H02M 3/33523; H02M 3/1584; H02M 3/285; H02M 3/33561; H02M 7/49; H02M 1/045; H02M 7/006; H02M 7/06; H02M 7/068; H02M 7/153; H02M 7/19; H02M 7/08; H02M 7/17; H02M 7/493; H02M 7/53806; H02M 7/5381; H02M 7/217; H02M 7/538466; H02M 7/5387; H02M 7/53871; H02M 7/53873; H02M 7/53875; G05F 1/00; G05F 1/10; G05F 1/12; G05F 1/46; G05F 1/455; G05F 1/45; G05F 1/445; G05F 1/66; G05F 1/40; G05F 1/42; G05F 1/44; G05F 1/462; G05F 1/52; G05F 1/56; G05F 3/10; G05F 3/16; G05F 3/18; G05F 3/185; G05F 3/20; G05F 3/26; G05F 3/30; G05F 3/205; G05F 3/22; G05F 3/24; G05F 3/222; G05F 3/242; G05F 3/225; G05F 3/227; G05F 3/245; G05F 3/247; G05F 3/262; G05F 3/265; G05F 3/267; G05F 1/575; H05B 39/048; B23K 11/24; H04B 2215/069; Y02B 70/1491; H02J 3/46; H02J 3/38
See application file for complete search history.

(56) References Cited

OTHER PUBLICATIONS

Breda et al., “Optimized Distributed Digital Control and Communication Architecture for Flying Capacitor Modular Multilevel Converter Based PMSM Drives,” IEEE Energy Conversion Congress and Exposition (ECCE), 2022.
Goetz et al., “Control of Modular Multilevel Converter With Parallel Connectivity—Application to Battery Systems,” IEEE Transactions on Power Electronics, Nov. 2017, vol. 32, No. 11.
Rietmann et al., “Field Bus for Data Exchange and Control of Modular Power Electronic Systems with High Synchronisation Accuracy of ±4 ns,” IEEJ Journal of Industry Applications, 2019, vol. 8, No. 2.

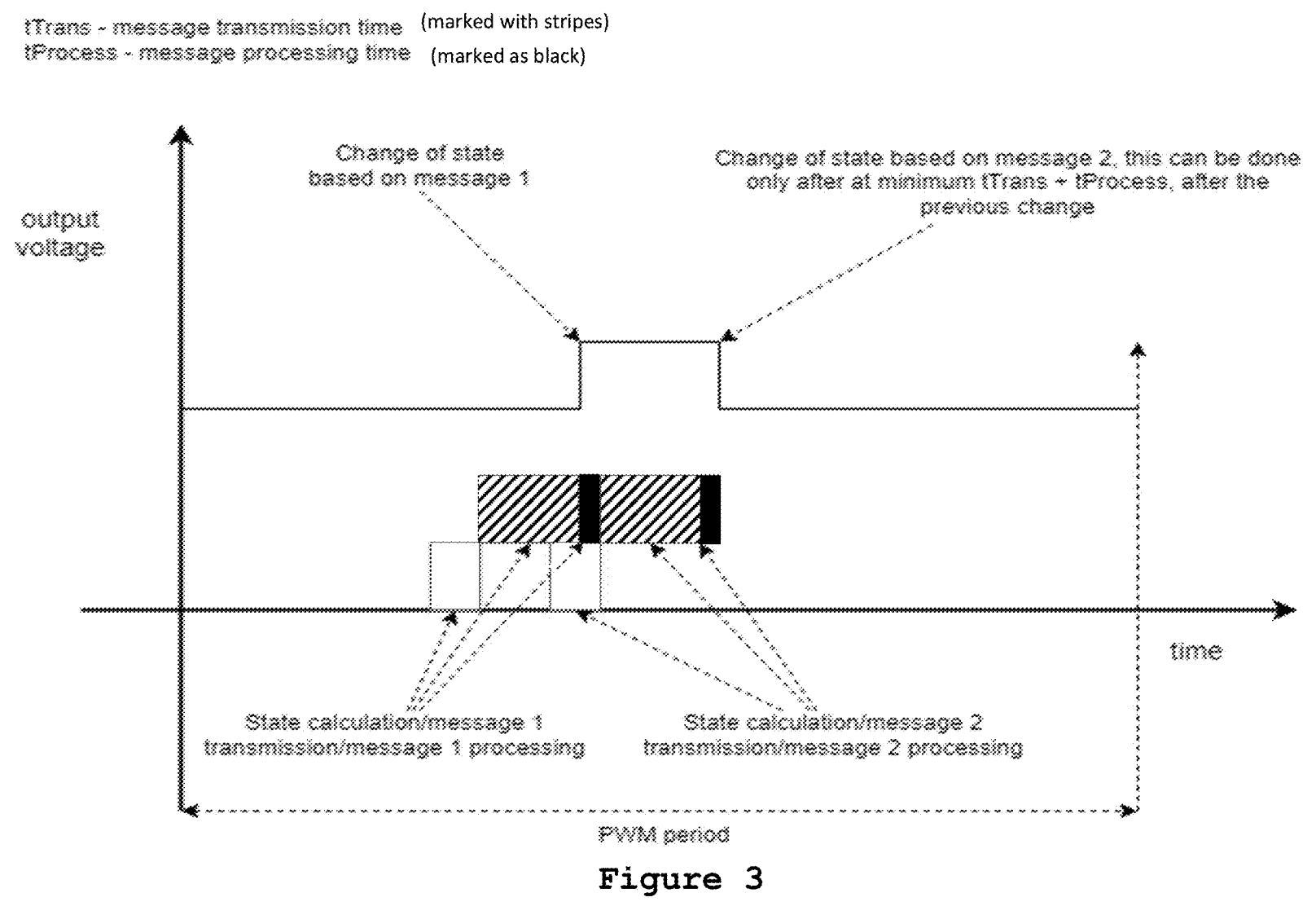

* cited by examiner tTrans - message transmission time (marked with stripes)
tProcess - message processing time (marked as black)

output voltage

Change of state based on message 1

Change of state based on message 2, this can be done only after at minimum tTrans + tProcess, after the previous change time State calculation/message 1 transmission/message 1 processing State calculation/message 2 transmission/message 2 processing PWM period

Figure 3

HIGH BANDWIDTH MODULATION

CROSS-REFERENCE

This application claims priority to European Patent Application No. 23215794.1, filed Dec. 12, 2023, the entire disclosure of which is incorporated herein by reference.

FIELD

The present invention generally relates to a control system and a control method for controlling a multilevel converter.

BACKGROUND

A multilevel converter is a power conversion system that can generate a multistep (multilevel) voltage waveform from several DC input voltages. The multilevel converter finds vast application in many technology fields, amongst others, in the field of power conversion, for example, power conversion in motor vehicles. A multilevel converter for AC applications is also called an AC battery. In controlling the multilevel converter by a distributed control system of the multilevel converter, high bandwidth modulation may be used to control the output of the multilevel converter, that is, the output of the AC battery.

However, due to physical dimensions of the multilevel converter, it might be difficult to control the whole distributed control system from one control unit. This is especially the case for control of switching modules of the distributed control system which interconnect individual capacitors/battery modules of the multilevel converter. Therefore, it may be necessary to control switching of a switching module from a controller which can be placed close to the switching module.

At the same time, calculation of a required module switching needs to be centralized to be able to consider many parameters. For example, a required state of a switching module for a specific point in time is calculated in dependency on states of other modules and cannot be calculated in isolation by the respective controller of the switching module itself.

Yet, achieving such a configuration with a conventional technology may require faster communication bus speed or delay processing within the multilevel converter when a standard bus speed is to be used.

SUMMARY

It is an object of the present invention to provide an efficient control system for controlling a multilevel converter.

The present invention is defined by the subject-matter of independent claims. Preferred embodiments are given by the subject-matter of dependent claims. Further examples are provided for facilitating the understanding of the invention.

According to an embodiment of the present invention, there is provided a control system for controlling a multilevel converter comprising a plurality of switching modules, each switching module connected to an energy source, the control system comprising: a central control unit; and one or more module control units, wherein the central control unit is configured to transmit a command for controlling the plurality of switching modules to the one or more module control units before a start of a pulse width modulation, PWM, period, wherein each of the one or more module control units is configured to receive the command from the central control unit before the start of the PWM period and apply the command to one or more switching modules of the plurality of switching modules within the PWM period.

According to another embodiment of the present invention, there is provided a control method for a control system controlling a multilevel converter comprising a plurality of switching modules, each switching module connected to an energy source, the control system comprising a central control unit and one or more module control units, the control method comprising: transmitting, by the central control unit, a command for controlling the plurality of switching modules to the one or more module control units before a start of a pulse width modulation, PWM, period, receiving, by each of the one or more module control units, the command from the central control unit before the start of the PWM period and applying, by the each of the one or more module control units, the command to one or more switching modules of the plurality of switching modules within the PWM period.

According to the invention, it is possible to reduce a required communication bus speed. In other words, for a standard bus speed, it is possible to achieve much higher duty cycle resolution. Therefore, the present invention can provide more time for message processing and possible error handling in case the message is not received correctly.

BRIEF DESCRIPTION OF THE DRAWINGS

Embodiments of the present invention, which are presented for better understanding the inventive concepts, but which are not to be seen as limiting the invention, will now be described with reference to the figures in which:

FIG. 3 shows message transmission time and message processing time of a module control unit according to an example configuration;

DETAILED DESCRIPTION

In the following disclosure, the expression “AC battery” and the expression “multilevel converter” may be interchangeably used.

Figure 1:
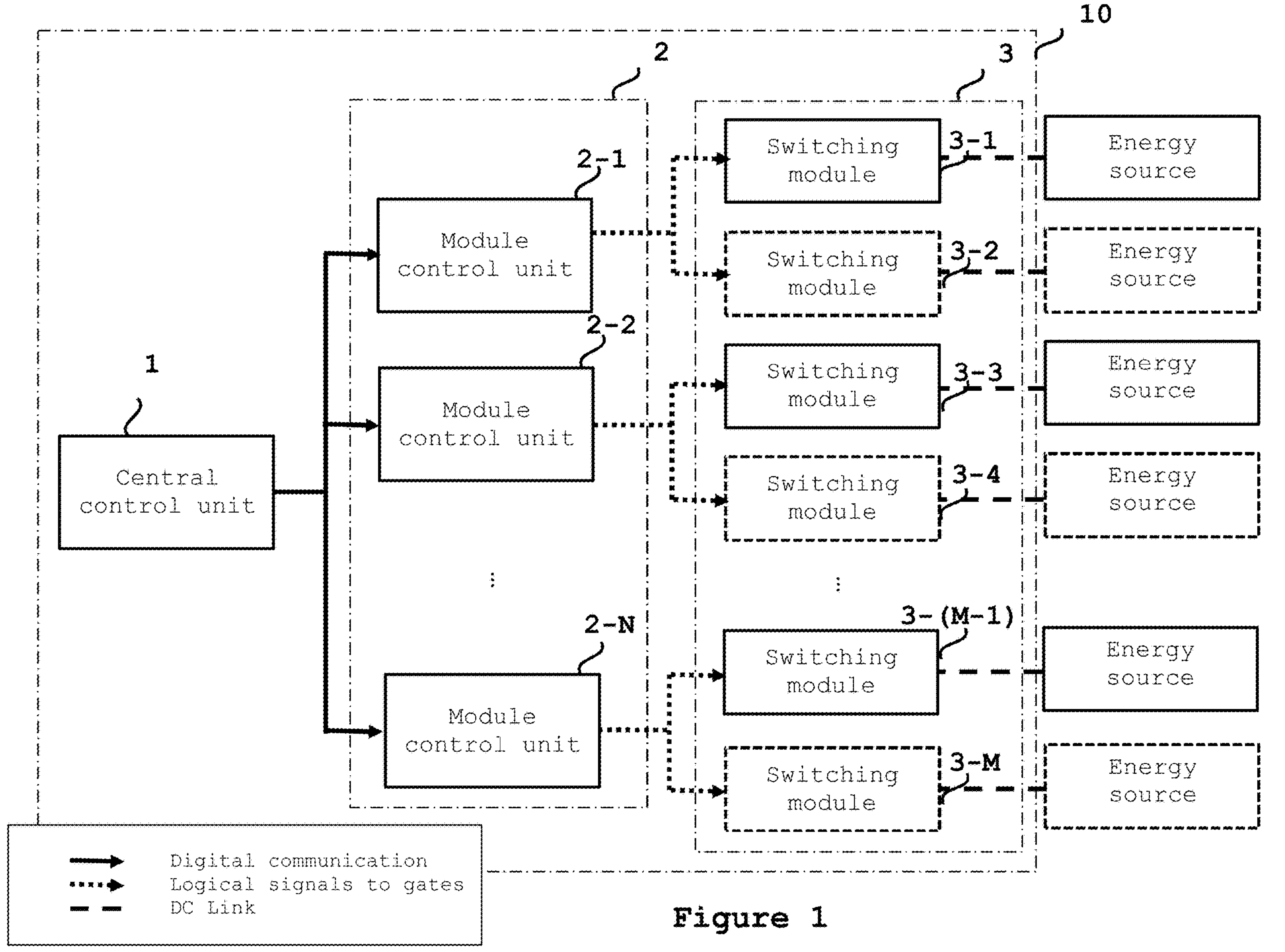
FIG. 1 shows schematically a control system with distributed control units according to an embodiment of the present invention.

FIG. 1 shows schematically a control system with distributed control units according to an embodiment of the present invention.

The control system of FIG. 1 is a control system 10 for controlling a multilevel converter. The multilevel converter comprises a plurality of switching modules and each switching module is connected to an energy source. The energy source can be understood as a battery module or a capacitor module.

As shown in FIG. 1, the control system 10 comprises a central control unit 1 and one or more module control units 2. The one or more module control units, 2-1, 2-2, . . . 2-N (N is the number of the one or more module control units) may be collectively called as the one or more module control units 2. The central control unit 1 is configured to transmit a command for controlling the plurality of switching modules 3 to the one or more module control units 2 before a start of a pulse width modulation (PWM) period. The plurality of switching modules 3-1, 3-2, . . . 3-M (M is the number of the plurality of switching modules) may be collectively called as the plurality of switching modules 3. Each of the one or more module control units 2 is configured to receive the command from the central control unit 1 before the start of the PWM period and apply the command to one or more switching modules of the plurality of switching modules 3 within the PWM period.

The central control unit 1 may be responsible for calculating required states of the one or more module control units 2. A type of communication between the central control unit 1 and the one or more module control units 2 may be digital communication, which means that messages to be communicated between the central control unit 1 and the one or more module control units 2 are written in bits. For example, the command is written in bits.

The central control unit 1 is configured to transmit the command before the start of the PWM period and preferably, directly before the start of the PWM period. In other words, the central control unit 1 may be configured to transmit the command for the (targeted) PWM period in a previous PWM period that is directly preceding to the targeted PWM period. By transmitting the command to the one or more module control units 2 before the start of the PWM period, the one or more module control units 2 may be able to receive the command necessarily early to apply the received command at the beginning of the PWM period.

As shown in FIG. 1, the each of the one or more module control units 2 is connected to one or more switching modules of the plurality of switching modules 3. For example, one module control unit may be connected to one switching module or to a plurality of switching modules. The module control unit and the one or more switching modules corresponding to the module control unit may communicate with logical signals input to gate(s) of the one or more switching modules.

The each of the one or more module control units 2 is configured to receive the command before the start of the PWM period and apply the command within the PWM period. In other words, the each of the one or more module control units 2 may not need to both receive and apply the command within one PWM period. The each of the one or more module control units 2 may apply the command in the PWM period that is already received in a preceding PWM period.

The command transmitted from the central control unit 1 and received by the one or more module control units 2 before the start of the PWM period may be processed by the one or more module control units 2 until the start of the PWM period.

In more detail, the command may be received, decoded by the one or more module control units 2 and corresponding actions may be taken by the one or more module control units 2.

A length of the PWM period may be predetermined based on a switching frequency. The switching frequency may be a system parameter. The range of the switching frequency may be between 5 to 80 kHz. The switching parameter may be given by an output filter design. For example, in automotive application, the switching frequency may be given by motor specification.

For example, the PWM period may be set such that a change of a voltage setpoint between two consecutive PWM periods remains within one voltage level defined by one energy source. Nevertheless, the present invention is not limited thereto and the change of the voltage setpoint can be also multiple levels within one PWM period.

As shown in FIG. 1, each switching module is connected to an energy source. The switching module is connected to the energy source via a DC Link. It can be understood that the control system 10 for controlling a multilevel converter is connected to a plurality of energy sources. By controlling each of the plurality of energy sources, in more specific example, by controlling each of the plurality of battery modules, it is possible to generate a multilevel voltage output of the multilevel converter.

Figure 2:
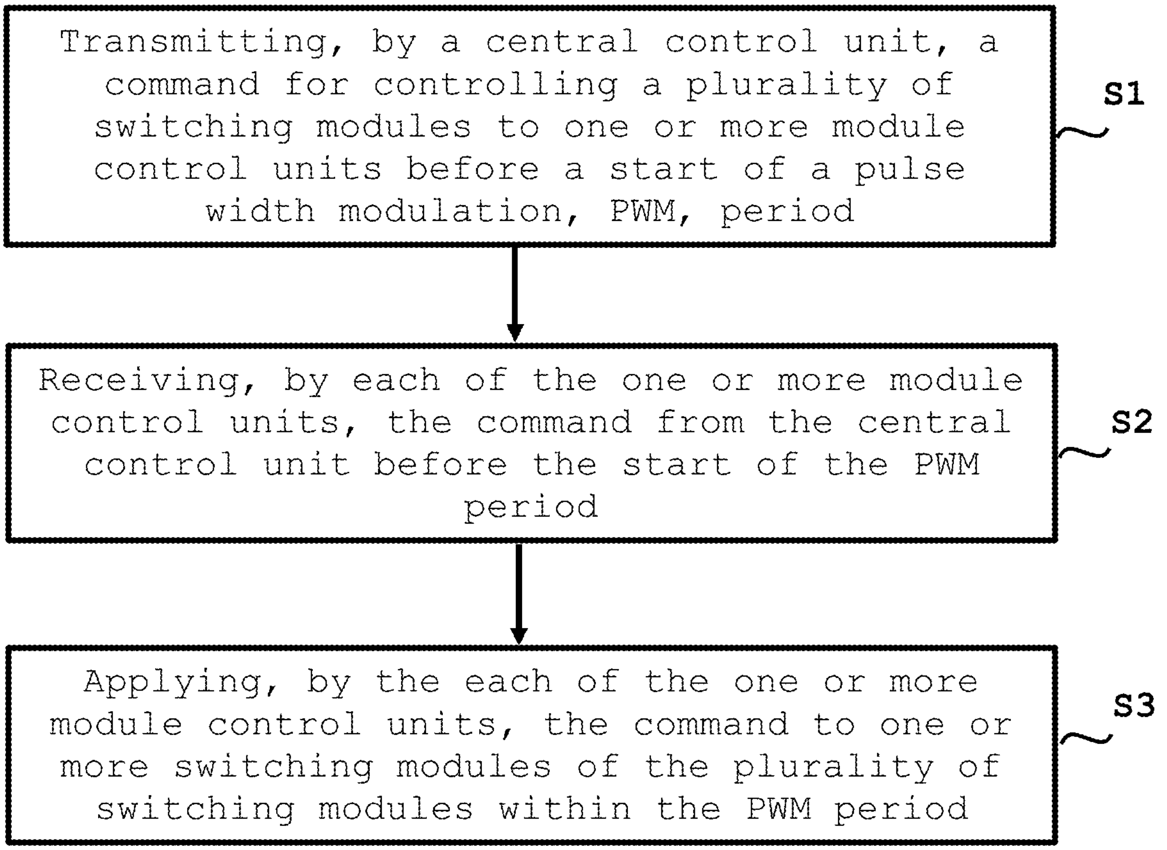
FIG. 2 shows a schematic flow chart of a control method according to an embodiment of the present invention.

FIG. 2 shows a schematic flow chart of a control method according to an embodiment of the present invention. The control method may be understood correspondingly to the control system 10.

In other words, the control method for a control system 10 controlling a multilevel converter comprising a plurality of switching modules, wherein each switching module is connected to an energy sources, and the control system 10 comprises a central control unit 1 and one or more module control units, comprises: a step (S1) of transmitting, by the central control unit 1, a command for controlling the plurality of switching modules 3 to the one or more module control units 2 before a start of a pulse width modulation (PWM) period; a step (S2) of receiving, by each of the one or more module control units 2, the command from the central control unit 1 before the start of the PWM period; and a step (S3) of applying, by the each of the one or more module control units 2, the command to one or more switching modules of the plurality of switching modules 3 within the PWM period.

Figure 4:
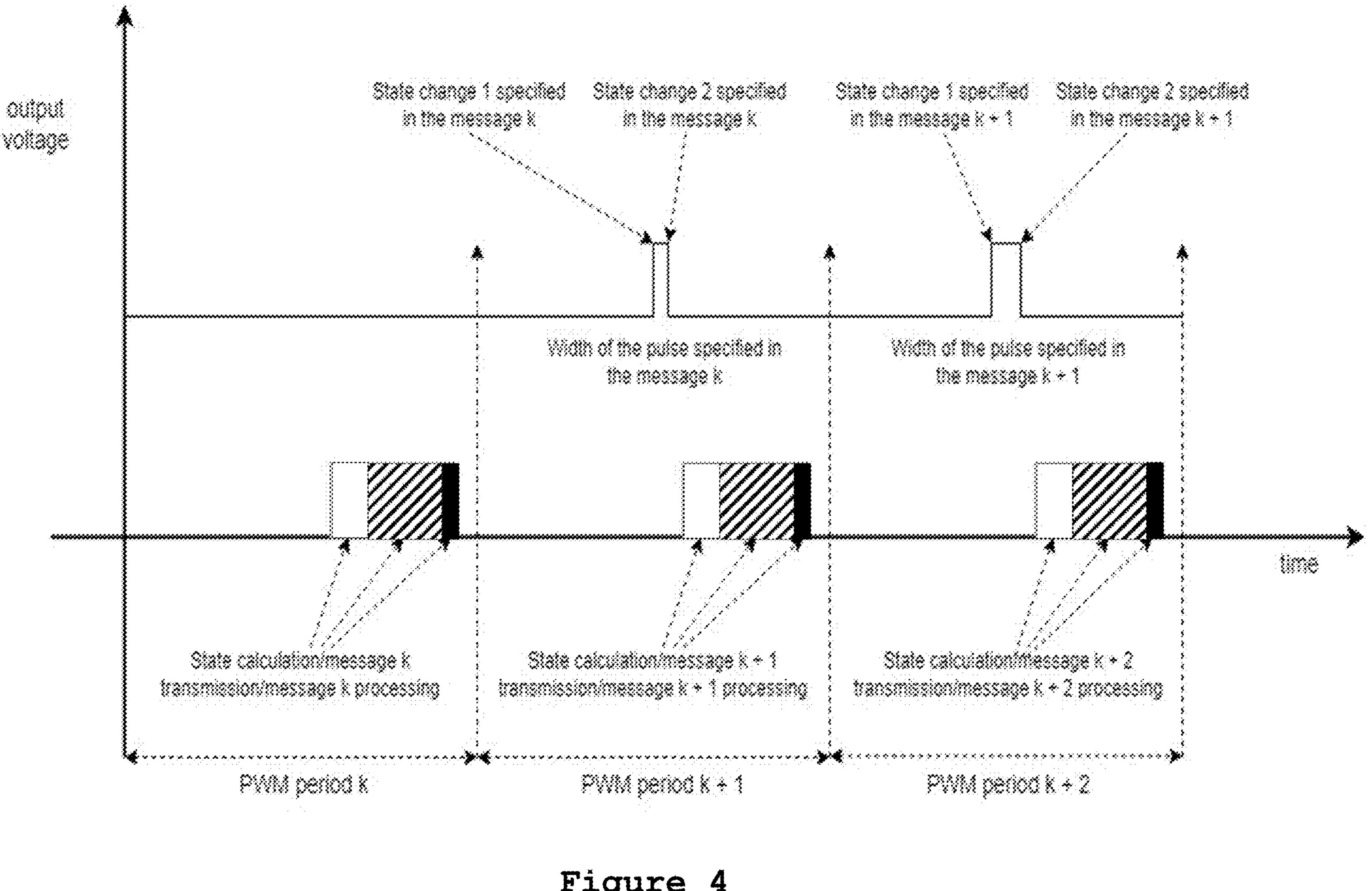
FIG. 4 shows message transmission time and message processing time of a module control unit according to an embodiment of the present invention.

FIGS. 3 and 4 show message transmission time and message processing time of a module control unit in two different configurations.

FIG. 3 shows message transmission time and message processing time of a module control unit according to an example configuration. In conventional implementations, once required states of module control units are calculated by a central control unit 1, the required states are communicated to the module control units and the module control units apply the required states as fast as possible. Consequently, once a change to a module state, that is, a state of a module is to be applied, it takes at least the amount of time needed to transmit a message to switch the corresponding module control unit to another state. This is shown in FIG. 3. Boxes marked with stripes imply tTrans, message transmission time and boxes marked as black imply tProcess, message processing time. The message contains data for state change only for one point in time, which is, the current time.

As it can be seen in FIG. 3, to make a change of a state based on message 1, it may take time in calculating the state, transmitting a "message 1" to the module control unit and processing the "message 1" in the module control unit. When a next change should be made on the state, even if a state calculation of "message 2" is done while transmitting and processing of the "message 1" is being performed, it still needs at least the message transmission time and the message processing time of the "message 2" to change the state based on the "message 2".

In other words, if rapid state changes are desired, there is a limitation that the changes cannot be performed faster than having at least tTrans+tProcess time difference between two state changes. This may be a serious limitation since it may imply that a high-speed communication bus is needed and/or a duty cycle resolution should be lower.

FIG. 4 shows message transmission time and message processing time of a module control unit according to an embodiment of the present invention. In the embodiment, instead of sending a command including required states just for one time point, a command including required states for all state changes for a whole PWM period including timings of each of the state changes may be sent. Furthermore, the command is sent in advance, preferably, in a previous PWM period directly preceding to the PWM period. Information on the timings can take many forms and is not limited to a certain type. Preferably, the information on the timings may be derived from a duty cycle of the PWM period.

In FIG. 4, three PWM periods—PWM period k, PWM period k+1, and PWM period k+2—are shown. In the PWM period k, a state is calculated by the central control unit 1, indicated by the white box of the PWM period k. Then, within the PWM period k, the calculated state is transmitted to the module central unit, indicated by the striped box of the PWM period k. When the module control unit receives the state, the state is processed by the module control unit still within the PWM period k, indicated by the black box of the PWM period k. The state is a state to be changed/applied in next PWM period, the PWM period k+1. Since the state is already processed before the start of the PWM period k+1, it would be possible to apply the state at a desired timing within the PWM period k+1 without any delay caused by transmitting and/or processing.

In the command, the information on the timings may be included. Therefore, since the command is already transmitted and processed by the module control unit, it enables to apply the desired state changes contained in the command on the respective timings as they are contained in the command.

Applying a state change may not necessarily imply a change of a state of the module control unit. If a desired state and a current state of the module control unit are identical, the module control unit may not change the state by applying the state change. If the desired state and current state of the module control unit are different, the module control unit may change the state by applying the state change.

Also, state of the module control unit may mean an internal state that is to change the corresponding one or more switching modules. Therefore, it can be understood that state(s) of the respective one or more switching modules are controlled/switched according to the state of the module control unit. In other words, the states of the respective one or more switching modules may follow the state of the module control unit.

In one embodiment, within the PWM period, only one module control unit of the one or more module control units 2 may be configured to control at a time, corresponding one or more switching modules to change an output voltage of the multilevel converter.

In this embodiment, the length of the PWM period is set such that a change of a voltage setpoint between two consecutive PWM periods remains within one voltage level defined by one energy source. The voltage setpoint is a desired average voltage level of the output voltage of the multilevel converter within one PWM period.

Accordingly, the control system 10 according to this embodiment is optimized to change one voltage level by switching only one module control unit. In other words, by switching only one module control unit to change one voltage level, it is possible to achieve an optimized and efficient control system.

Figure 5:
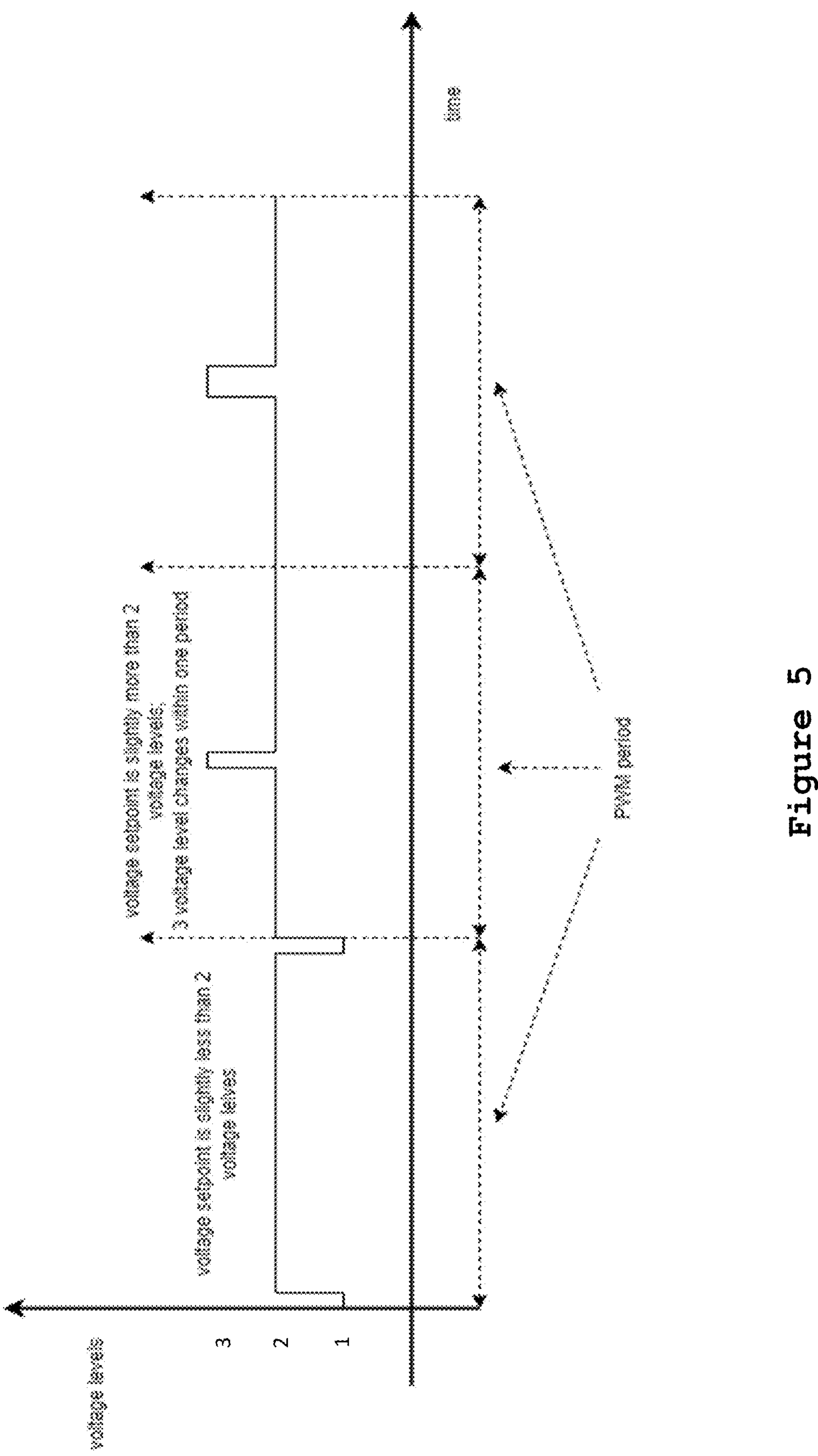
FIG. 5 shows an example of voltage level changes according to an embodiment of the present invention.

FIG. 5 shows an example of voltage level changes according to an embodiment of the present invention. On the left PWM period, voltage levels when a voltage setpoint is slightly less than "voltage level 2" are shown. On the middle PWM period, voltage levels when a voltage set point is slightly more than "voltage level 2" are shown. In the middle PWM period, three voltage changes in one PWM period can be observed. The first voltage change is at the beginning of the PWM period when "voltage level 1" is changed to "voltage level 2", the second voltage change is when "voltage level 2" is changed to "voltage level 3", and the third voltage change is when "voltage level 3" is changed to "voltage level 2". A unit of the voltage level may be determined by the energy source. From now on, "voltage level X" may be simply referred to "X".

In an embodiment, the central control unit 1 may be configured to determine the command so that a voltage setpoint in each PWM period corresponds to a desired average voltage level of the output voltage of the multilevel converter.

For example, in FIG. 5, the desired average voltage level in the middle PWM period may be "2.1". In this case, by setting the voltage level at the beginning of the middle PWM period to "2" and having the voltage level of "3" between the second voltage change and the third voltage change, while the time length between the second voltage change and the third voltage change may be 10% of the PWM period, it may be possible to achieve the desired average voltage level of "2.1" by calculation of "2"*90%+"3"*10%.

Therefore, the command may be determined such that the voltage setpoint after all voltage changes within the PWM period would result in the desired average voltage level of the PWM period.

In one embodiment, a module identification may be assigned to each of the one or more module control units 2. The module identification may be included in the command. When the each of the one or more module control units 2 receives the command, the each of the one or more module control units 2 may be able to pick up a part of the command corresponding to the each of the one or more module control units 2. By this configuration with the module identification, the central control unit 1 may be able to generate only one command for the whole one or more module control units, since the one or more module control units 2 can pick up respective parts of the command by the module identification.

The command may comprise a configuration information for the PWM period to be applied by the one or more module control units 2 that received the command.

The command may comprise the module identification of each of the one or more module control units 2. In other words, the one or more module control units 2 may pick up respective module information from the configuration information of the command.

The command may be adapted to a type of the PWM. For example, PWM may be center-aligned PWM, left-aligned PWM or right-alighted PWM. In the center-aligned PWM, changes to output voltage of the multilevel converter are center-aligned in a PWM period. In the left-aligned PWM, changes to output voltage of the multilevel converter are left-aligned in a PWM period. In the right-aligned PWM, changes to output voltage of the multilevel converter are right-aligned in a PWM period.

For the left-aligned PWM or the right-aligned PWM, the configuration information may comprise at least one of information for determining existence and a type of a change of a state of the each of the one or more module control units 2 within the PWM period and information for determining a timing of the change of the state.

For the center-aligned PWM, the configuration information may comprise at least one of information for determining existence and a type of a first state change and a second state change of each of the one or more module control units 2 within the PWM period and information for determining timings of the first state change and the second state change.

For example, in the center-aligned PWM, the command may comprise a first vector of states of the one or more module control units 2 at the beginning of the PWM period, a second vector of states of the one or more module control units 2 applied upon a first voltage level change, a third vector of states of the one or more module control units 2 applied upon a second voltage level change, and a duty cycle value.

In the center-aligned PWM, the first voltage level change and the second voltage level change are symmetrical to a center of the PWM period within the PWM period.

If a value of the duty cycle is 0, the second vector and the third vector is not used. This means that there would be no output voltage level change within the PWM period except of the beginning of the PWM period, where there might be one or more voltage level change.

Each of the one or more module control units 2 may pick up respective information based on its module identification. For example, a module control unit with a module identification of "1" may pick up the "1"st elements from each of the first vector, the second vector and the third vector.

Generally, PWM may be used to get a smooth output when a voltage setpoint is set to be a rational number while a voltage level definable by an energy source is to be an integer. For example, when an energy source defines one voltage level, by connecting a plurality of energy sources, it may be possible to achieve the voltage levels of "1", "2", "3", "4" and so on. In this case, when a voltage setpoint is set to "1.5", it may be not possible to achieve the voltage setpoint of "1.5" merely by connecting one or two energy sources. PWM can be used in this case. To achieve the voltage setpoint of "1.5", PWM may be performed between "voltage level 1" and "voltage level 2" with a duty cycle of 50%. Then, an average output voltage can be calculated as 1.5 (from 1*50%+2*50%), thus achieving the desired voltage setpoint.

Since the required voltage setpoint may be achieved by an average of voltages within a PWM period, the changes of output voltages may be aligned in different positions. In the above example, in case of the left-aligned changes, the voltage output may be "2" at the beginning of the PWM period and drop to "1" after 50% of the PWM period has passed. In case of the right-aligned changes, the voltage output may be "1" at the beginning of the PWM period and changed to "2" after 50% of the PWM period has passed. In case of the center-aligned changes, the voltage output may be "1" at the beginning of the PWM period, "2" between 25% and 75% of the PWM period, and dropped again to "1" after 75% of the PWM period is elapsed.

Since the state of the module control unit may control the state(s) of the corresponding one or more switching modules, the state(s) of the corresponding one or more switching modules may be called switching state(s) to distinguish it from the state of the module control unit. The state of the module control unit and the switching state may be or may not be in a same format.

In other words, the each of the one or more module control units 2 is configured to control one or more switching states of the respective one or more switching modules according to the state of the each of the one or more module control units 2 of the configuration information.

In this sense, the first vector may comprise switching states respectively corresponding to the states of the one or more module control units 2 at the beginning of the PWM period. Similarly, the second vector may comprise switching states respectively corresponding to the states of the one or more module control units 2 applied upon the first voltage level change, and the third vector may comprise switching states respectively corresponding to the states of the one or more module control units 2 applied upon the second voltage level change.

A switching state of a switching module may be one of series plus, series minus, bypass plus, bypass minus, passive and parallel. "Plus" and "minus" may mean polarities with respect to a reference point. For example, in a three-phase system, the reference point may be designated to be a neutral point of the three-phase system. In a one-phase system, the reference point may be designated to be any terminal of the one-phase system.

In the series plus connection, a negative side of a battery module of the AC battery is connected either to the reference point or to a positive side of a battery module which is also connected in series plus and is closer to the reference point. In the series plus connection, battery modules may create the output voltage which is positive with respect to the reference point.

In the series minus connection, the positive side of a battery module of the AC battery is connected either to the reference point or to the negative side of a battery module which is also connected in series minus and is closer to the reference point. In the series minus connection, battery modules may create the output voltage which is negative with respect to the reference point.

The one or more module control units 2 may be configured to change the output voltage of the multilevel converter by switching the corresponding one or more switching modules based on the respective switching state.

In an embodiment, the central control unit 1 and the one or more module control units 2 may be connected in a bus topology. In another embodiment, the central control unit 1 and the one or more module control units 2 may be connected in a star topology. However, the present invention is not limited to any type of topology and may adapt any type of topology that is advantageous to achieve, for example, an efficient communication and a synchronization between the central control unit 1 and the one or more module control units 2.

Each of the one or more module control units 2 may be synchronized with the central control unit 1 and thereby synchronized with each other. Although the one or more module control units 2 may have been synchronized with the central control unit 1 at the beginning, it is still important to constantly synchronize the central control unit 1 with the each of the one or more module control units 2, since clocks of individual module control units may drift away over a period of time.

The synchronization can be achieved in multiple ways. For example, a dedicated global lock signal may be used. While this may provide a more accurate synchronization, it may require additional wires. Therefore, message reception event, which does not require additional wires, may be used for the synchronization. Alternatively, bus clock signal may be used for the synchronization in case the bus used in the control system 10 provides the clock signal. These non-exhaustive ways of the synchronization are merely given as examples and the present invention is not limited any of the synchronization methods.

In one embodiment, the one or more module control units 2 may be configured to perform cyclic redundancy check on the command received from the control unit. The cyclic redundancy check may detect an error in digital communication. In this way, the control system 10 may be able to achieve a safer communication between the central control unit 1 and the one or more module control units 2.

Although detailed embodiments have been described, these only serve to provide a better understanding of the invention defined by the independent claims and are not to be seen as limiting to the present invention.

The invention claimed is:

1. A control system for controlling a multilevel converter comprising a plurality of switching modules, each switching module connected to an energy source, the control system comprising:

a central control unit; and one or more module control units;

wherein the central control unit is configured to transmit a command for controlling the plurality of switching modules to the one or more module control units before a start of a pulse width modulation (PWM) period;

wherein each of the one or more module control units is configured to receive the command from the central control unit before the start of the PWM period and apply the command to one or more switching modules of the plurality of switching modules within the PWM period;

wherein within the PWM period, only one module control unit of the one or more module control units is configured to control at a time, corresponding one or more switching modules to change an output voltage of the multilevel converter;

wherein a length of the PWM period is set such that a change of a voltage setpoint between two consecutive PWM periods remains within one voltage level defined by one energy source; and wherein the voltage setpoint is a desired average voltage level of the output voltage of the multilevel converter within one PWM period.

2. The control system according to claim 1, wherein the central control unit is configured to determine the command so that a voltage setpoint in each PWM period corresponds to a desired average voltage level of the output voltage of the multilevel converter.

3. The control system according to claim 1, wherein a module identification is assigned to each of the one or more module control units.

4. The control system according to claim 1, wherein the command comprises a configuration information for the PWM period to be applied by the one or more module control units that received the command.

5. The control system according to claim 4, wherein within the PWM period, changes of output voltage of the multilevel converter are center-aligned in a center-aligned PWM, left-aligned in a left-aligned PWM or right-aligned in a right-aligned PWM.

6. The control system according to claim 5, wherein:

for the left-aligned PWM or the right-aligned PWM, the configuration information comprises at least one of information for determining existence and a type of a change of a state of the each of the one or more module control units within the PWM period and information for determining a timing of the change of the state; and for the center-aligned PWM, the configuration information comprises at least one of information for determining existence and a type of a first state change and a second state change of each of the one or more module control units within the PWM period and information for determining timings of the first state change and the second state change.

7. The control system according to claim 4, wherein the one or more module control units are configured to pick up respective information from the configuration information of the command.

8. The control system according to claim 4, wherein the each of the one or more module control units is configured to control one or more switching states of the corresponding one or more switching modules according to the state of the each of the one or more module control units in the configuration information;

wherein the switching state is one of series plus, series minus, bypass plus, bypass minus, passive and parallel.

9. The control system according to claim 8, wherein the one or more module control units are configured to change the output voltage of the multilevel converter by switching the corresponding one or more switching modules based on the respective switching state.

10. The control system according to claim 1, wherein:

communication between the central control unit and the one or more module control units is digital communication; and communication between each of the one or more module control units and the corresponding one or more switching modules is logical signal.

11. The control system according to claim 1, wherein the central control unit and the one or more module control units are connected in a bus topology or a star topology.

12. The control system according to a claim 1, wherein the command transmitted from the central control unit and received by the one or more module control units before the start of the PWM period is processed until the start of the PWM period.

13. The control system according to claim 1, wherein each of the one or more module control units is synchronized with the central control unit and thereby synchronized with each other.

14. The control system according to claim 1, wherein the one or more module control units is configured to perform cyclic redundancy check on the command received from the central control unit.

15. A control method for a control system controlling a multilevel converter comprising a plurality of switching modules, each switching module connected to an energy source, the control system comprising a central control unit and one or more module control units, the control method comprising:

transmitting, by the central control unit, a command for controlling the plurality of switching modules to the one or more module control units before a start of a pulse width modulation (PWM) period;

receiving, by each of the one or more module control units, the command from the central control unit before the start of the PWM period and applying, by the each of the one or more module control units, the command to one or more switching modules of the plurality of switching modules within the PWM period;

wherein within the PWM period, controlling only one module control unit of the one or more module control units at a time, and changing, by corresponding one or more switching modules, an output voltage of the multilevel converter;

wherein a length of the PWM period is set such that a change of a voltage setpoint between two consecutive PWM periods remains within one voltage level defined by one energy source; and wherein the voltage setpoint is a desired average voltage level of the output voltage of the multilevel converter within one PWM period.

* * * * *